United States Patent
Mujawar (10) Patent No.: US 10,901,938 B2
(45) Date of Patent: Jan. 26, 2021

(54) DYNAMIC CONFIGURATION OF HARDWARE

(71) Applicant: ARM LIMITED, Cambridge (GB)

(72) Inventor: Sami Ur Rehman Zia Ur Rehman Mujawar, Cambridge (GB)

(73) Assignee: ARM LIMITED, Cambridge (GB)

( * ) Notice: Subject to any disclaimer, the term of this patent is extended or adjusted under 35 U.S.C. 154(b) by 212 days.

(21) Appl. No.: 15/616,085

(22) Filed: Jun. 7, 2017

(65) Prior Publication Data

US 2018/0357202 A1    Dec. 13, 2018

(51) Int. Cl.
*G06F 9/44* (2018.01)
*G06F 15/78* (2006.01)
*G06F 9/4401* (2018.01)

(52) U.S. Cl.
CPC ........ *G06F 15/7882* (2013.01); *G06F 9/4411* (2013.01); *G06F 15/7875* (2013.01)

(58) Field of Classification Search
CPC ........................................................ G06F 9/44
See application file for complete search history.

(56) References Cited

U.S. PATENT DOCUMENTS

| | | | | |
|---|---|---|---|---|
| 9,846,582 B2* | 12/2017 | Knichel | ............... | G06F 9/4401 |
| 2003/0120840 A1* | 6/2003 | Isozu | ................... | H04L 67/16 |
| | | | | 710/36 |
| 2004/0003135 A1* | 1/2004 | Moore | ................. | G06F 9/4411 |
| | | | | 719/321 |
| 2004/0215950 A1* | 10/2004 | Lindeman | ............ | G06F 9/4401 |
| | | | | 713/1 |
| 2007/0168399 A1* | 7/2007 | Schultz | ................ | G06F 9/4411 |
| 2010/0161804 A1* | 6/2010 | Jeon | ...................... | H04L 67/303 |
| | | | | 709/226 |
| 2012/0271472 A1* | 10/2012 | Brunner | ............... | G06F 1/3209 |
| | | | | 700/295 |
| 2013/0304641 A1* | 11/2013 | Dabbiere | ............... | G06F 13/10 |
| | | | | 705/40 |
| 2016/0195636 A1* | 7/2016 | Grau | ...................... | G01V 5/104 |
| | | | | 250/269.2 |
| 2017/0063641 A1* | 3/2017 | Su | ....................... | G06F 11/2284 |
| 2018/0107470 A1* | 4/2018 | Remis | ...................... | G06F 1/26 |

* cited by examiner

*Primary Examiner* — Jae U Jeon
(74) *Attorney, Agent, or Firm* — Nixon & Vanderhye, P.C.

(57) ABSTRACT

A data processing apparatus is provided. The data processing apparatus includes hardware locating circuitry for locating hardware associated with processing circuitry, and for causing hardware configuration data relating to the hardware to be generated. Providing circuitry causes the hardware configuration data to be provided to an operating system executing on the processing circuitry to enable the operating system to utilise the hardware.

15 Claims, 7 Drawing Sheets

DYNAMIC CONFIGURATION OF HARDWARE

TECHNICAL FIELD

The present disclosure relates to data processing. More particularly, it relates to the dynamic configuration of hardware in a data processing apparatus.

DESCRIPTION

Part of the process of making hardware associated with the operating system of a processing circuit involves the firmware supplying configuration data to the operating system regarding the hardware, such as how to communicate with and control that hardware. The configuration data can be supplied in the form of, for example, Advanced Configuration and Power Interface (ACAPI) tables and/or System Management BIOS (SMBIOS) tables, which are typically provided to the operating system when the operating system starts up. However, even slight changes to the hardware or the hardware setup cause this configuration data to change. The configuration data must therefore be rewritten each time the hardware changes. Debugging this configuration data can also be very hard since without having any ability to control hardware, it is difficult if not impossible to output information that could be useful in aiding debugging. Hardware can also have a large number of configuration options, which can make such data long. As a consequence of all of this, the data is difficult and time-consuming to put together.

SUMMARY

Viewed from a first example configuration, there is provided a data processing apparatus comprising: hardware locating circuitry to locate hardware associated with processing circuitry, and to cause hardware configuration data relating to said hardware to be generated; and providing circuitry to cause said hardware configuration data to be provided to an operating system executing on said processing circuitry to enable said operating system to utilise said hardware in a predetermined manner.

Viewed from a second example configuration, there is provided a data processing method, comprising: locating hardware associated with processing circuitry; causing hardware configuration data relating to said hardware to be generated; and causing said hardware configuration data to be provided to an operating system executing on said processing circuitry to enable said operating system to utilise said hardware in a predetermined manner.

Viewed from a third example configuration, there is provided a data processing apparatus comprising: means for locating hardware associated with processing circuitry and for causing hardware configuration data relating to said hardware to be generated; and means for causing said hardware configuration data to be provided to an operating system executing on said processing circuitry to enable said operating system to utilise said hardware in a predetermined manner.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: hardware locating circuitry to locate hardware associated with processing circuitry, and to cause hardware configuration data relating to said hardware to be generated; and providing circuitry to cause said hardware configuration data to be provided to an operating system executing on said processing circuitry to enable said operating system to utilise said hardware in a predetermined manner.

In accordance with the above, the hardware locating circuitry is able to find, i.e. discover or be directly told about hardware that is associated with (e.g. directly or indirectly connected to, or available to) the processing circuitry. Having located such hardware, hardware configuration data is generated. In this way, the hardware configuration data that is generated is specific to the hardware that has been located by the hardware locating circuitry. This hardware configuration data can then be provided to an operating system that executes on the processing circuitry. The operating system is thereby able to use the hardware configuration data in order to utilise the hardware in a given manner. Here the term "operating system" is used in its broadest sense to refer to any software that supervises and provides an interface to the hardware. For example, the operating system may be responsible for providing other software such as applications access to the hardware. The hardware need not be directly connected to the processing circuitry. In some cases, the hardware will be indirectly connected to the processing circuitry or could even be part of the processing circuitry or the data processing apparatus itself. Note that although the hardware configuration data is provided to the operating system in order to enable the operating system to utilise the hardware in a predetermined manner, there is no requirement that the processing circuitry does in fact use the hardware. Furthermore, such a predetermined manner could be that access to the hardware is limited or denied. Generating the hardware configuration data in this way can reduce or limit the need for any of the hardware configuration data to be hand-crafted. Furthermore, regardless of the number of different hardware options available, since the hardware configuration data is generated by circuitry, the task of producing the hardware configuration data does not significantly increase as the number of different hardware options increases or as the amount of hardware connected to the processing circuitry increases. A further advantage of generating the hardware configuration data in this way is that the probability of an error occurring in the hardware configuration data can be substantially reduced. In particular, once the generation scheme has been verified, it should be possible to rely on the hardware configuration data that is generated from that point forward. In this way, the probability of an error occurring can be substantially reduced.

In some embodiments, the data processing apparatus comprises compilation circuitry to receive hardware information from said hardware locating circuitry, wherein said hardware information relates to said hardware associated with said processing circuitry, and to compile said hardware information to generate said hardware configuration data. In such embodiments, the hardware locating circuitry locates the available hardware and consequently generates hardware information containing data relating to the hardware that is associated with the processing circuitry. This hardware information is then provided to compilation circuitry that compiles this information in order to produce the hardware configuration data. Consequently, the hardware configuration data is dynamically generated based on the hardware information that has been gathered. In this way, it is possible to instead produce a generator or compiler that causes the correct hardware configuration data to be generated based on the hardware information that is gathered and the specifics of the hardware that is available to the processing circuitry.

In some embodiments, the data processing apparatus comprises specification gathering circuitry to obtain one or more parameters relating to said hardware and to provide said one or more parameters to said compilation circuitry, wherein said compilation circuitry compiles said hardware information to generate said hardware configuration data in dependence on said one or more parameters. The specification gathering circuitry is able to obtain parameters relating to the hardware that is available to the processing circuitry. Based on these parameters, which are also provided to the compilation circuitry, the hardware configuration data can be further customised. For example, the parameter could specify an area of the memory that is used to store a frame buffer for use on a display. Consequently, even though the underlying hardware may be the same in a number of different systems, each of those systems may be configured to use a different area of memory for the frame buffer as specified by the parameters. The skilled person will appreciate that potentially any hardware configuration option could be controlled by such parameters and therefore customised between different devices.

In some embodiments, said one or more parameters relating to said hardware are provided by management circuitry. The management circuitry could be provided as a circuitry separate to the processing circuitry. In this way, management of the specific processors can be kept separate from the processing circuitry and altered for different systems cheaply and efficiently. In some embodiments, the management circuitry could be provided by an off-device element. This can be done in order to improve large-scale manufacturing efficiency for example.

In some embodiments, the data processing apparatus comprises cache circuitry to cache said hardware information. By using such cache circuitry, the need to gather hardware information repeatedly can be reduced. The cache circuitry and or the hardware locating circuitry can be configured to cause the hardware locating circuitry to locate hardware associated with the processing circuitry every period of time or when it is detected or suspected that the hardware has been altered. One way of detecting such a change, for example, could be a change in the voltage drawn by the processing circuitry or data processing apparatus. This change could indicate an addition, change, or removal of hardware that is connected to the processing circuitry or data processing apparatus, which in turn causes the voltage drawn by the processing circuitry or data processing apparatus to change. Such a change would therefore necessitate performing the location operation again so that the correct hardware configuration data was being provided to the operating system. Another way of detecting such a change would be to check the status of a parameter/flag in non-volatile memory which can be modified to set it to 'dirty'.

In some embodiments, said hardware locating circuitry is to locate hardware associated with said processing circuitry by accessing a list of potential hardware and issuing a query for one or more items in said list. Initially, the hardware locating circuitry could receive a list of hardware that is available to the processing circuitry. This list may be incomplete, or could be only a list of hardware that is potentially available to the processing circuitry. For example, such a list could be generated based on a fixed specification of the hardware. Having obtained such a list, a query could be issued for each item of hardware contained within the list to determine whether that hardware is present or not. The hardware information could then be generated based on the hardware that is determined as being present.

There are a number of ways in which such a list of potential hardware could be provided to the hardware locating circuitry. In some embodiments, said list of potential hardware is provided by said processing circuitry. Alternatively, said list of potential hardware is statically stored on either said data processing apparatus or said processing circuitry.

In some embodiments, said hardware locating circuitry is to locate said hardware and said providing circuitry is to cause said hardware configuration data to be provided during startup of said operating system. One of the initial tasks of the operating system during startup, is to load the necessary software in order to be able to make use of hardware that is associated with the processing circuitry (on which the operating system might reside). Indeed, since the display is one such piece of the hardware, the operating system is unable to display text or graphics until the hardware configuration data relating to the display (which may include data such as the location of the frame buffer) has been loaded. In some cases, if some of the hardware configuration data is wrong, contains an error, or has been misconfigured, then the operating system might be unable to start up. In such cases, it might not be possible to output debug data—particularly if the hardware configuration data related to the display has not been loaded by the operating system.

In some embodiments, said hardware configuration data comprises one or more firmware tables. For example, in some embodiments, said hardware configuration data comprises at least one standard-specified firmware table.

There are a number of different standard-specified firmware tables. However, in some embodiments, said hardware configuration data comprises one or more ACPI tables. Note that although the word "table" is used, there is no necessity that the information contained with an Advanced Configuration Power Interface (ACPI) table is simply tabulated information. In particular, such tables can and often do make use of functions and data structures.

In some embodiments, said hardware configuration data comprises one or more SMBIOS tables. For example, System Management Bios (SMBIOS) tables could be used to specify a hardware layout, position, or access.

In some embodiments, said data processing circuitry comprises said processing circuitry. For example, whilst in some embodiments the data processing circuitry could take the form of a chip or circuit whose purpose is to determine the hardware available to a separate processing circuit and to provide the hardware configuration data to an operating system such as one that resides on that processing circuit, in other embodiments, the processing circuit is part of the data processing apparatus itself. The data processing apparatus could take the form of, for instance, an embedded device such as a mobile phone, a computer such as a tablet or personal computer, or a server. Such a data processing apparatus could take any number of forms, and examples where the processing circuit is part of the data processing apparatus or separate from the data processing apparatus will be apparent to the skilled person.

In some embodiments, said predetermined manner inhibits or restricts the use of the hardware associated with the processing circuitry. In this way, even if hardware is connected to processing circuitry, the one or more parameters can be used to inhibit, limit, restrict, or prevent the use of that hardware. For example, if a Central Processing Unit (CPU) having a number of cores is connected to the processing circuitry, one of the parameters might limit the number of cores that can be used by the operating system. In some embodiments, the predetermined manner allows reconfiguration or recalibration using parameters. For example, the core (big/little) used for booting could be one such parameter.

Particular embodiments will now be described with reference to the figures.

Figure 1:
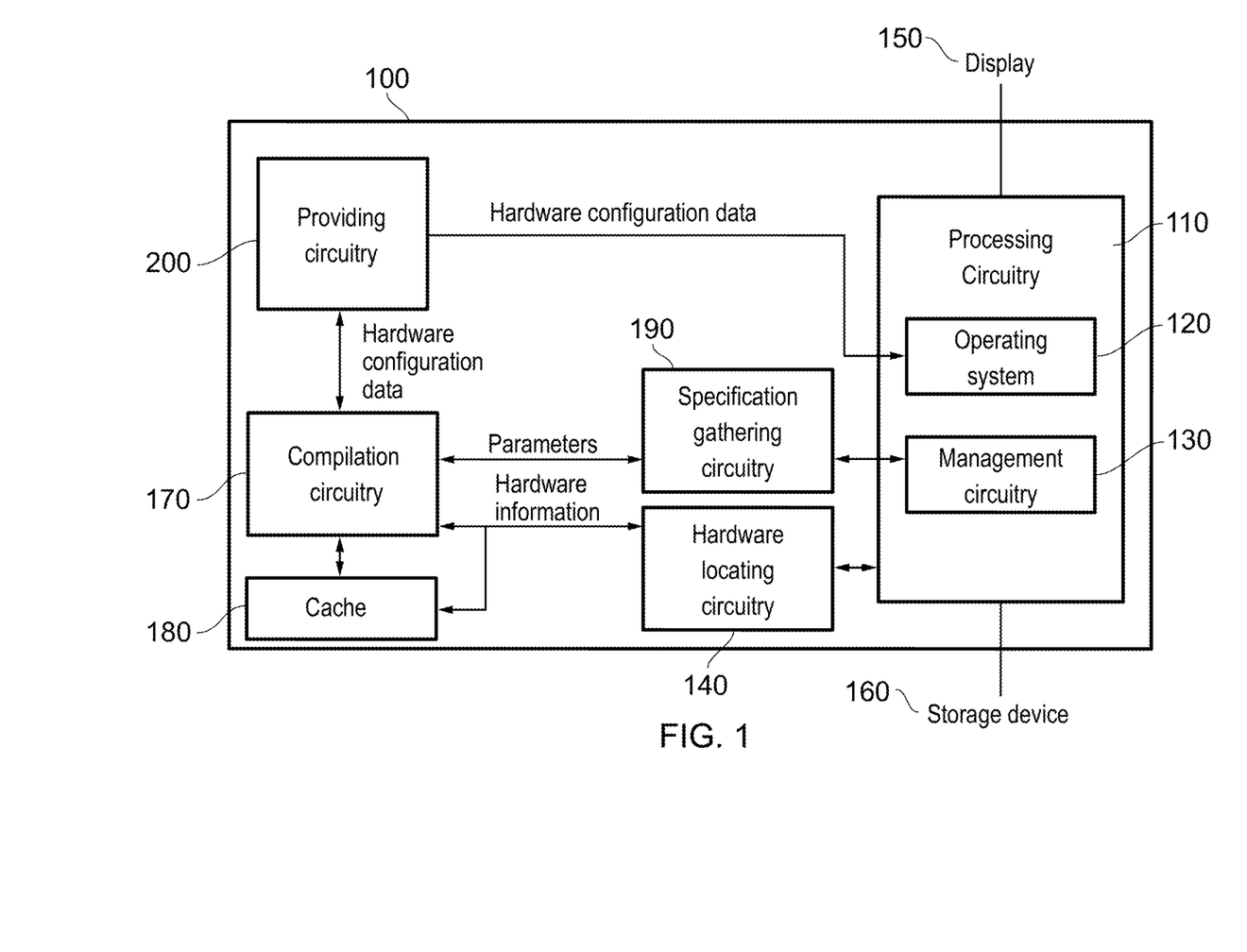
FIG. 1 illustrates a data processing apparatus in accordance with some embodiments.

FIG. 1 illustrates an example of a data processing apparatus 100 in accordance with some embodiments. The data processing apparatus 100 includes processing circuitry 110 on which an operating system 120 executes. In other embodiments, the processing circuitry 110 is separate from the rest of the data processing apparatus 100. In addition, the processing circuitry 110 contains management circuitry 130. The management circuitry 130 could itself be a small processor or processing circuitry that is responsible for providing data regarding the configuration of the data processing apparatus 110. In particular, the management circuitry 130 could contain information relating to the hardware that is associated with the processing circuitry 110 and the different parameters with which that hardware is to be operated by the processing circuitry 110.

The data processing apparatus 100 also includes hardware locating circuitry 140. The hardware locating circuitry 140 in these embodiments communicates with the processing circuitry 110 in order to determine hardware that is associated with (e.g. directly or indirectly connected to or available to) the processing circuitry 110. In these embodiments, a display 150 and a storage device 160 are each shown to be connected to the processing circuitry 110. Consequently, the hardware locating circuitry 140 will become aware of each of these. Having become aware of the hardware, the hardware locating circuitry 140 will generate hardware information. This is provided to compilation circuitry 170 and a cache 180.

Having provided the hardware information to the cache 180, the hardware locating circuitry 140 need not necessarily go to the effort of locating all of the hardware available to the processing circuitry 110 in the future. In some embodiments, the cache 180 will record the time at which the hardware information provided by the hardware locating circuitry 140 was stored. In this way, after a period of time, i.e. once the cached hardware information has expired, the hardware locating circuitry 140 can again gather information relating to the available hardware. Storing the hardware information in the cache 180 can speed up the process of generating the hardware configuration data since the process of scanning for the available hardware can be avoided in certain circumstances.

The data processing apparatus 100 also includes specification gathering circuitry 190. The specification gathering circuitry 190 interacts with the management circuitry 130 of the processing circuitry 110 in order to acquire parameters relating to hardware located by the hardware locating circuitry 140. The parameters gathered by the specification gathering circuitry 190 are then passed to the compilation circuitry 170.

The compilation circuitry 170 receives the parameters provided by the specification gathering circuitry 190 and the hardware information gathered by the hardware locating circuitry 140 (possibly via cache 180). The compilation circuitry 170 uses this information to generate hardware configuration data which is then provided to providing circuitry 200. The providing circuitry 200 provides this hardware configuration data to the operating system 120 of the processing circuitry 110. The operating system 120 is then able to use this hardware configuration data in order to communicate with or make use of the hardware such as the display 150 and the storage device 160. This utilisation is made in accordance with requirements provided by the management circuitry 130. Note that the process of providing the hardware configuration data to the operating system 120 may take place via a Unified Extensible Firmware Interface (UEFI). This is the system that is one of the first things to be loaded in a modern computer system and takes responsibility for obtaining (among other things) software (such as firmware) to access hardware. Having obtained this information, the UEFI then causes the operating system to boot, which in turn accesses or requests the relevant software from the UEFI.

As will be appreciated, by compiling the hardware configuration data at the compilation circuitry 170 based on parameters obtained by the specification gathering circuitry 190 and the hardware information provided by the hardware locating circuitry 140, there is no need for the hardware configuration data to be written by hand. Accordingly errors that might occur in producing the hardware configuration data by hand may be reduced or even eliminated. Furthermore, regardless of the range of different types of hardware that may be made available to the processing circuitry 110 and the range of different parameters that could apply to that hardware 130, the hardware configuration data can still be easily generated. This reduces or even eliminates the complexity of the hardware configuration data, thereby reducing or eliminating the potential for errors.

Figure 2:
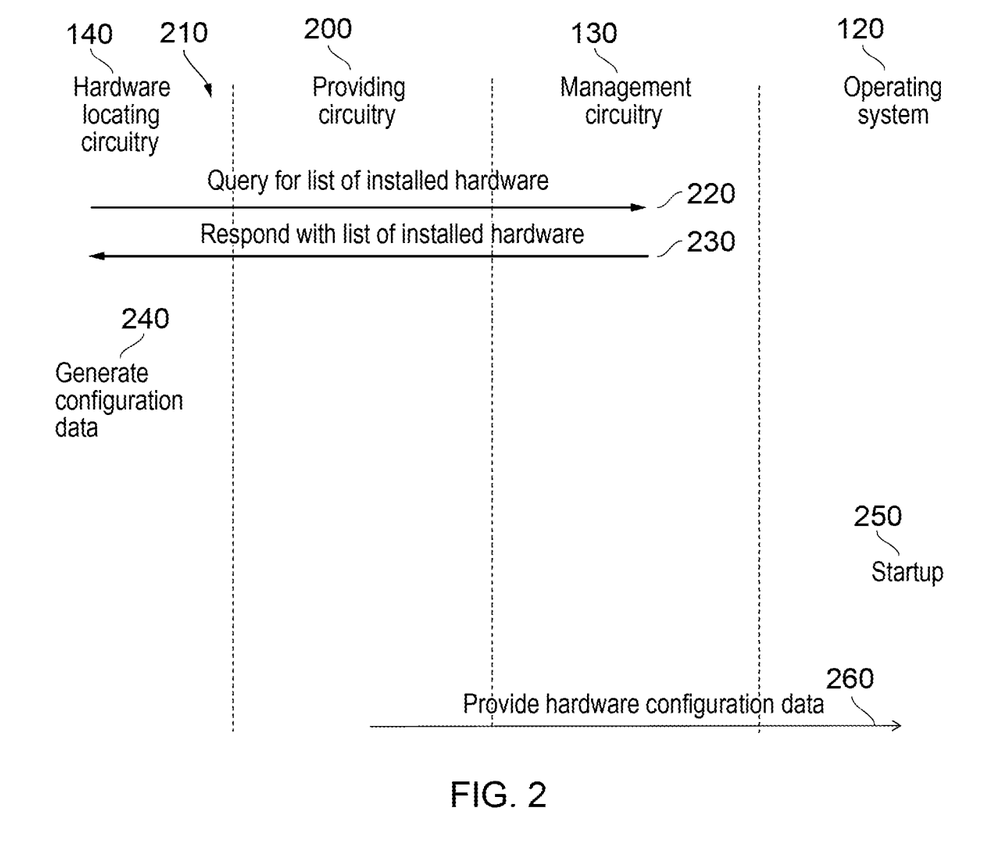
FIG. 2 illustrates a timing diagram of the circuitry of the data processing apparatus in relation to other circuitries in accordance with some embodiments.

FIG. 2 illustrates a timing diagram 210 for the behaviour of different components shown within the data processing apparatus 100 in accordance with some embodiments. At a first step 220, a query is initiated by the hardware locating circuitry 140 for a list of installed hardware on the data processing apparatus 100. This query is issued to the management circuitry 130. The management circuitry 130 responds with a list of installed hardware in a step 230. Based on this list, the hardware locating circuitry 140 generates, in a step 240, configuration data that corresponds with the list of installed hardware received in step 230. After the operating system 120 starts up in a step 250, the generated hardware configuration data is provided by the providing circuitry 200 to the operating system 120 in a step 260. Accordingly, based on the list of installed hardware received from the management circuitry 130 at the hardware locating circuitry 140, a set of configuration data can be generated and then provided to the operating system 120 after the operating system starts up. The operating system 120 will thereby have the necessary hardware configuration data in order to use the hardware in a predetermined manner.

Figure 3:
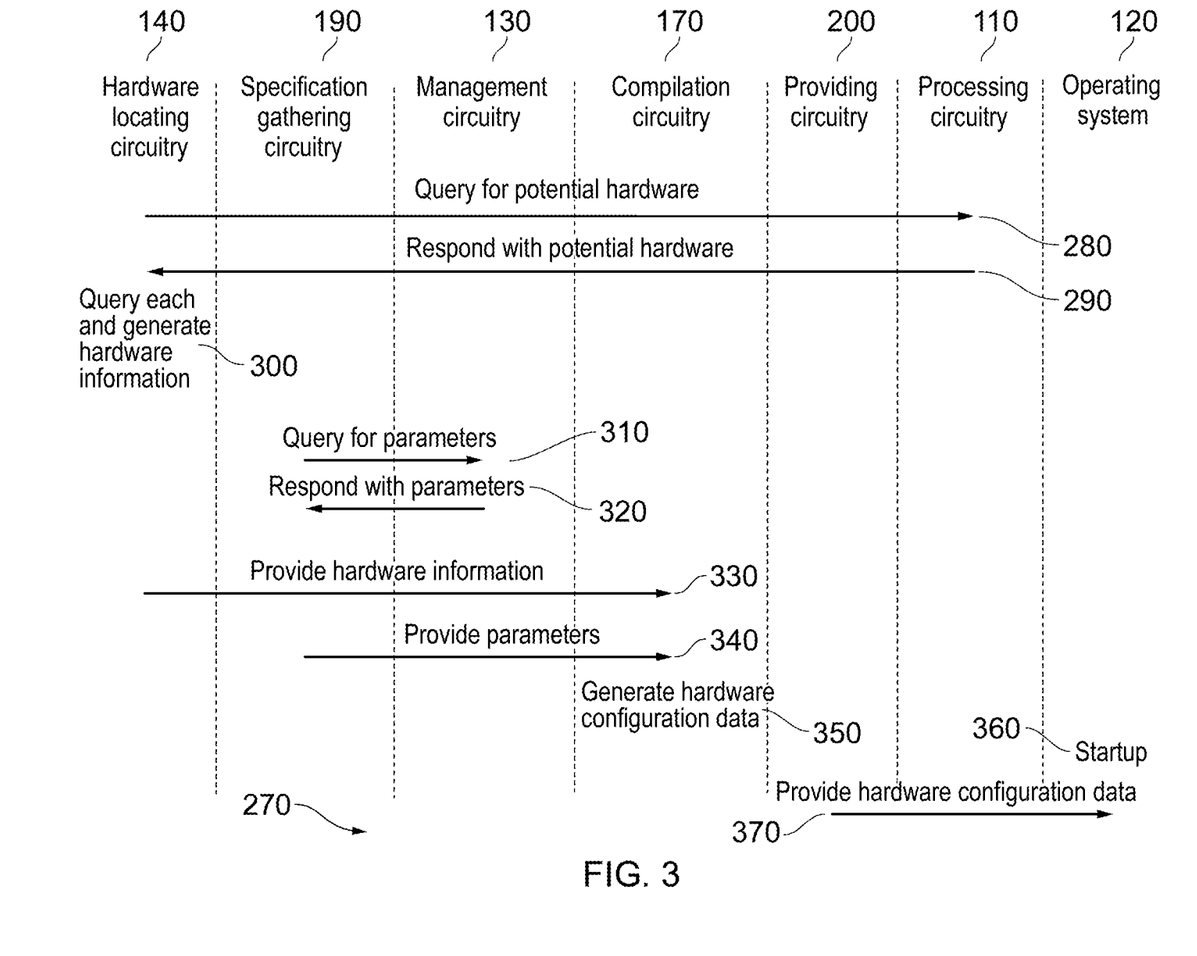
FIG. 3 illustrates a timing diagram of the circuitry of the data processing apparatus in relation to other circuitries in accordance with some embodiments.

FIG. 3 illustrates a timing diagram 270 that shows the sequence of steps taken by elements of a data processing apparatus 100 in accordance with some embodiments. In a step 280, a query is issued by the hardware locating circuitry 240 to the processing circuitry 110 for potential hardware that may be associated with the processing circuitry 110. In a step 290, this list of potential hardware is provided back from the processing circuitry 110 to the hardware locating circuitry 140. In this case, the hardware that is listed by the processing circuitry 110 may not actually be available or even present. Accordingly, the hardware locating circuitry 140 then issues one or more queries to some of the items of potential hardware. Note that it may not be possible to query all peripherals to verify their presence, since some peripherals do not have ID registers. This occurs in a step 300. Hardware information is then generated based on these responses. In particular, hardware information is generated for each piece of hardware that is determined to be present. Specification gathering circuitry 190 issues a query for parameters for the discovered hardware to the management circuitry 130 in a step 310. In each case, the management circuitry 130 returns any relevant parameters to the specification gathering circuitry 190 in step 320. In a step 330, the hardware information that was generated in step 300 is provided by the hardware locating circuitry 140 to the compilation circuitry 170. Similarly, in a step 340, the parameters acquired by the specification gathering circuitry 190 are provided to the compilation circuitry 170. In a step 350, hardware configuration data is generated by the compilation circuitry 170. The hardware configuration data is generated on the basis of the hardware information received from the hardware locating circuitry 140 and the parameters received by the specification gathering circuitry 190. In these embodiments, the generation takes the form of a compilation. At a step 360, the operating system 120 starts up. Then, once the tables are built at a step 370, the generated hardware configuration data is provided to the operating system 120. This can occur, for instance, by using the UEFI to register the tables (hardware configuration data). The OS can then query UEFI to retrieve the tables. Accordingly, the operating system 120 is provided with customised hardware configuration data that enables the operating system 120 to make use of the hardware that is not only potentially available to the processing circuitry 110 but which has been determined as being actually available to the processing circuitry 110. Furthermore the hardware configuration data that is provided to the operating system 120 has been customised with parameters provided by the management circuitry 130, which can be used to specify the exact manner in which the operating system 120 should utilise and/or communicate with hardware. All of this is achieved without the need for the hardware configuration data to have been written by hand. Consequently, errors are reduced, and the time taken to configure the data processing apparatus can be reduced as compared to a situation where the hardware configuration data is written by hand.

Figure 4:
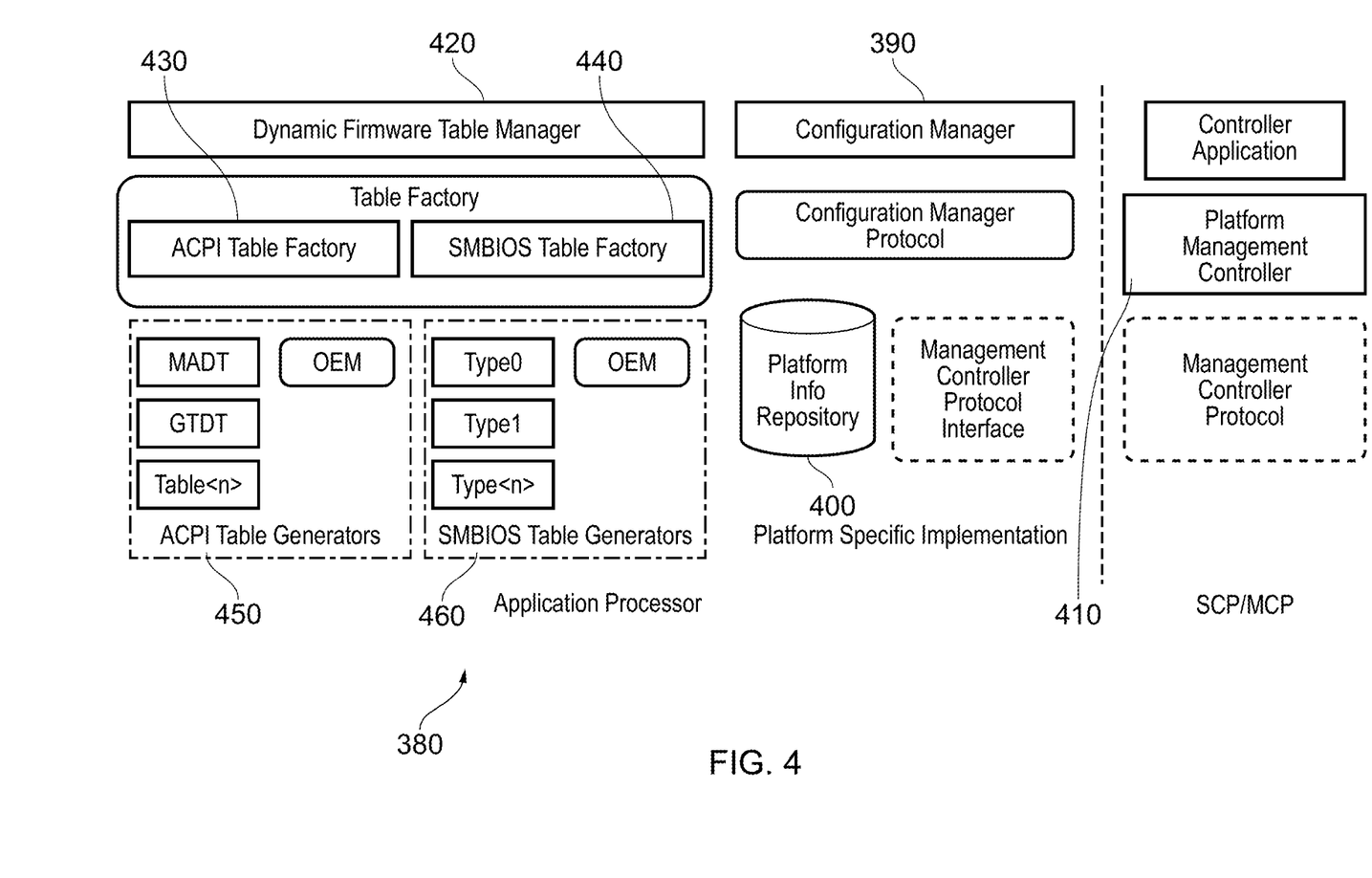
FIG. 4 schematically illustrates a diagram showing a data processing apparatus comprising processing circuitry in accordance with some embodiments.

FIG. 4 illustrates a data processing apparatus 380 in accordance with some embodiments. In this embodiment it is assumed that the processing circuitry forms part of the data processing apparatus 380. In such embodiments, the configuration manager 390 performs the role of the hardware locating circuitry 140. The configuration manager 390 determines the hardware that is available to processing circuitry, i.e. the data processing apparatus 380 itself, and stores hardware information data in a platform information repository 400. Note, however, that in some embodiments, the platform information repository 400 may be statically generated. In other words the configuration manager 390 may not need to determine the available hardware on the data processing apparatus 380 and instead the hardware information could be stored directly in the platform information repository 400. The platform management controller 410 provides information regarding the specific configuration of the hardware. For example, this may specify the number of cores of a CPU that are made available to the operating system. In this embodiment, such information is gathered by the configuration manager 390 and also stored in the platform information repository 400. A Dynamic Firmware Table Manager 420 is provided that acts as previously described compilation circuitry 170. In this example, the dynamic firmware takes the form of one or more ACPI tables or SMBIOS tables. Accordingly, an ACPI table factory 430 is provided together with an SMBIOS table factory 440. Each of these factories is responsible for determining the appropriate one of a set of generators 450, 460 to use, given the type of the hardware along with other factors such as the manufacturer and possibly variant of the hardware. Each generator indicates how to produce a table of the relevant format, given the hardware information and the parameters that have been provided into the platform info repository 400.

Once the tables have been generated by the table generators 450, 460 the dynamic firmware table manager 420 causes these tables to be provided to the operating system in a similar way to the providing circuitry 200. For example, the operating system may require these tables as it starts up in order to gain access to the hardware.

Figure 5:
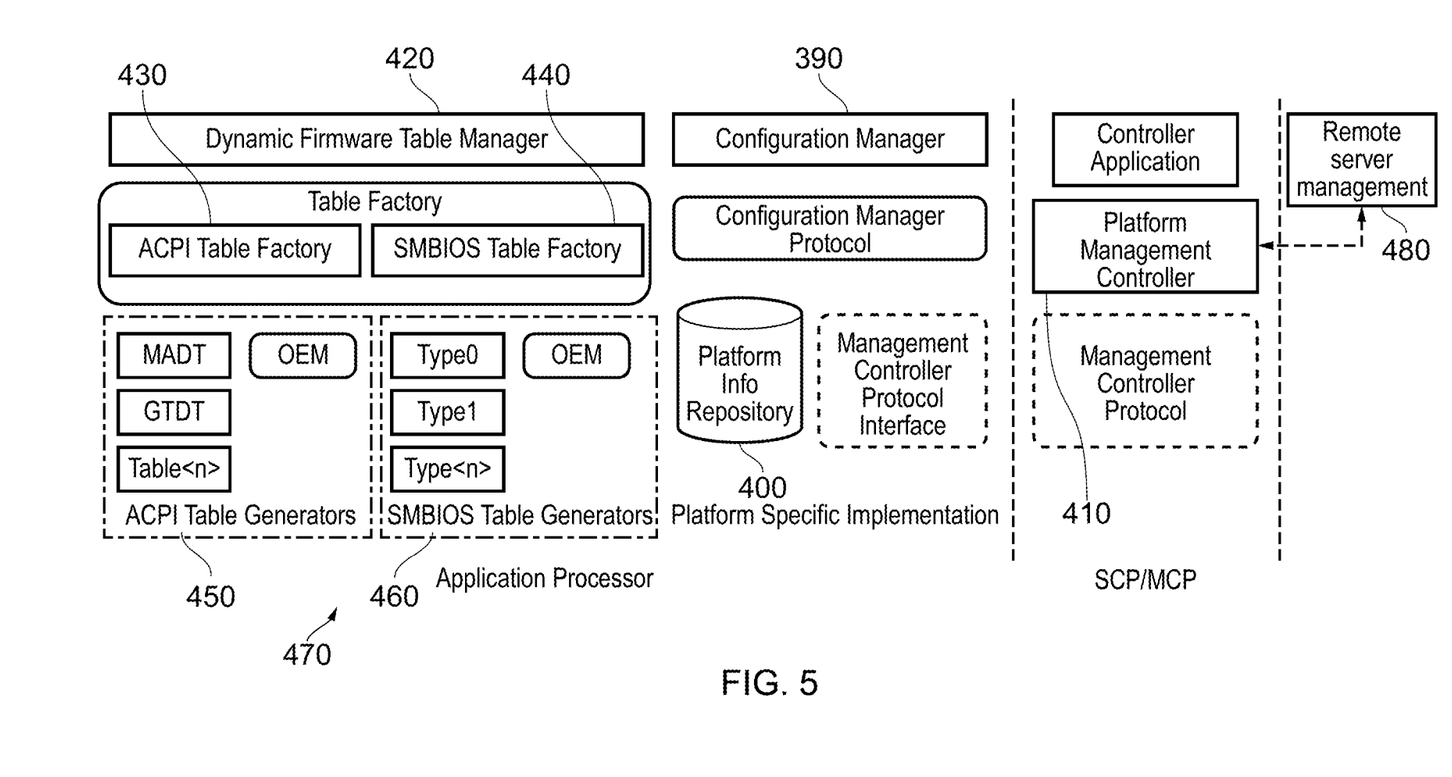
FIG. 5 schematically illustrates a diagram showing a data processing apparatus comprising processing circuitry managed by a remote server, in accordance with some embodiments.

FIG. 5 illustrates an embodiment of a data processing apparatus 470 in accordance with some embodiments. The data processing apparatus 470 is similar to the previously described data processing apparatus 380, except that a remote server management circuitry 480 has been provided. The remote server management circuitry 480 makes it possible to influence or control the behaviour of the platform management controller 410. In this way, it is possible for a remote device to control the configuration of the hardware. This could be useful in, for example, manufacturing large batches of heterogeneous devices to match a common specification. For example, different batches of hardware may utilise different revisions of a display controller. In this case, in order to achieve a consistent or uniform specification, it is desirable to configure the hardware so that, even though the hardware differs physically, it operates in a consistent manner. This could be controlled at a server so that a number of manufacturing elements can each be controlled to use the correct configuration based on the hardware being supplied. As another example, if node A has 64 CPUs and node B has 128 CPUs then node B could be configured to make only 64 CPUs available to the operating system to provide a common view. In some embodiments, the remote server management circuitry 480 implements bi-directional communication. In this way, the remote server management circuitry 480 can make a request to the end server node (in a server farm) for its current configuration. It can then make a decision if it wants to change a parameter for the end server node and issue a request for re-configuration.

Figure 6:
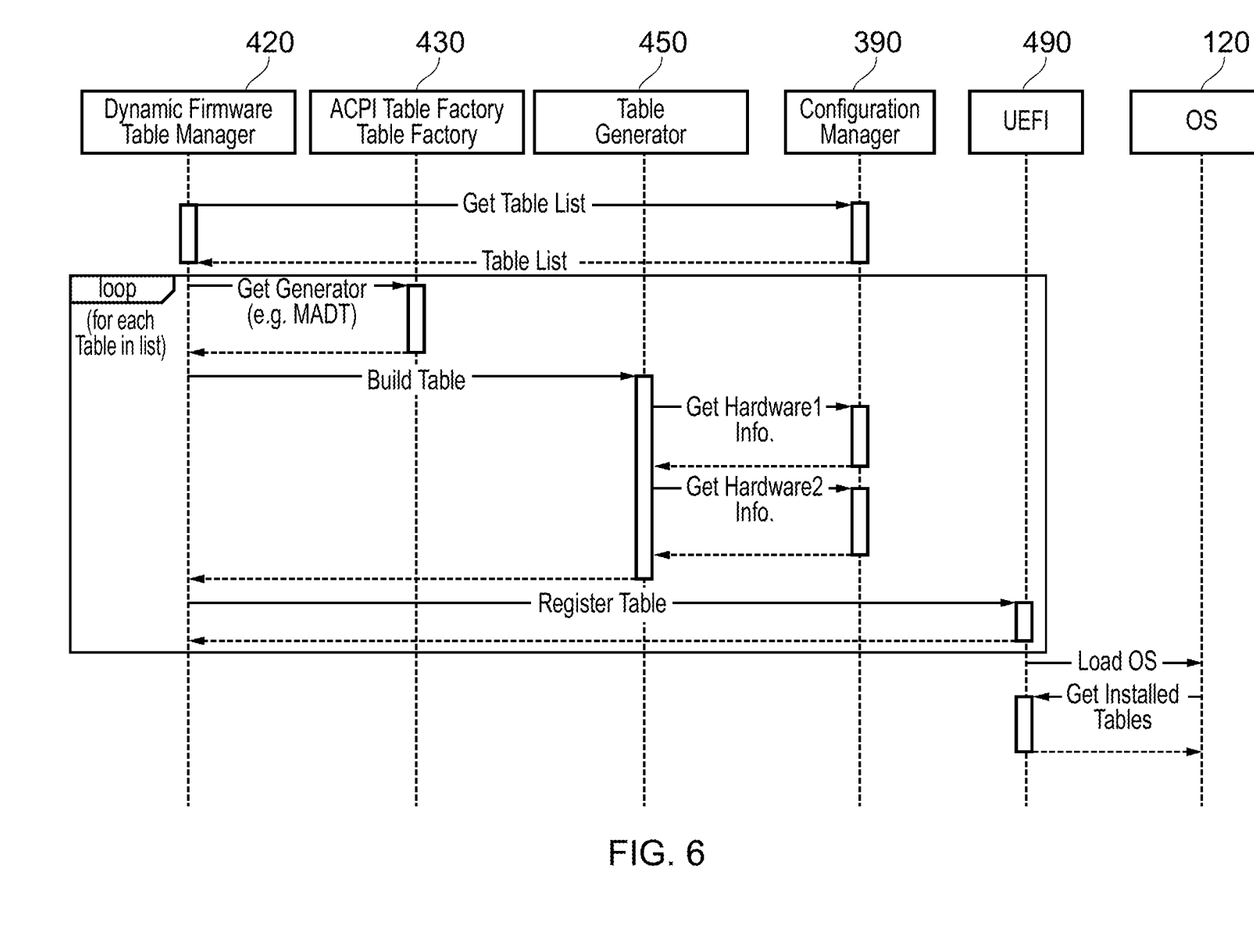
FIG. 6 illustrates a timing diagram of the circuitry of the data processing apparatus in relation to other circuitries in accordance with some embodiments.

FIG. 6 illustrates the process of providing the hardware configuration data, in the form of ACPI tables, to the operating system. The dynamic firmware table manager 420 requests a list of tables to install from the configuration manager 390. The configuration manager 390 responds. The response (the list of tables to install) may itself take the form of an ACPI table. Then, for each table provided in the list, the dynamic firmware table manager 420 accesses the appropriate ACPI table generator 450 by querying the ACPI table factory 430 for the appropriate table generator 450 to use. Having obtained the reference to the table generator 450, the dynamic firmware table manager 420 queries the table generator 450. The table generator then obtains the relevant hardware information and parameters from the configuration manager 390. Note that a single table could involve (as in this case) obtaining hardware information and parameters in respect of several pieces of hardware from the configuration manager 390. All of this information is then returned to the table generator 450, that generates the ACPI table, which is then returned to the dynamic firmware table manager 420. The table is then registered with UEFI firmware 490. This process repeats for each table provided in the list of tables to be installed. On startup, the UEFI 490 causes the operating system 120 to be loaded, and the operating system 120 gets the installed tables from the UEFI 490.

Figure 7:
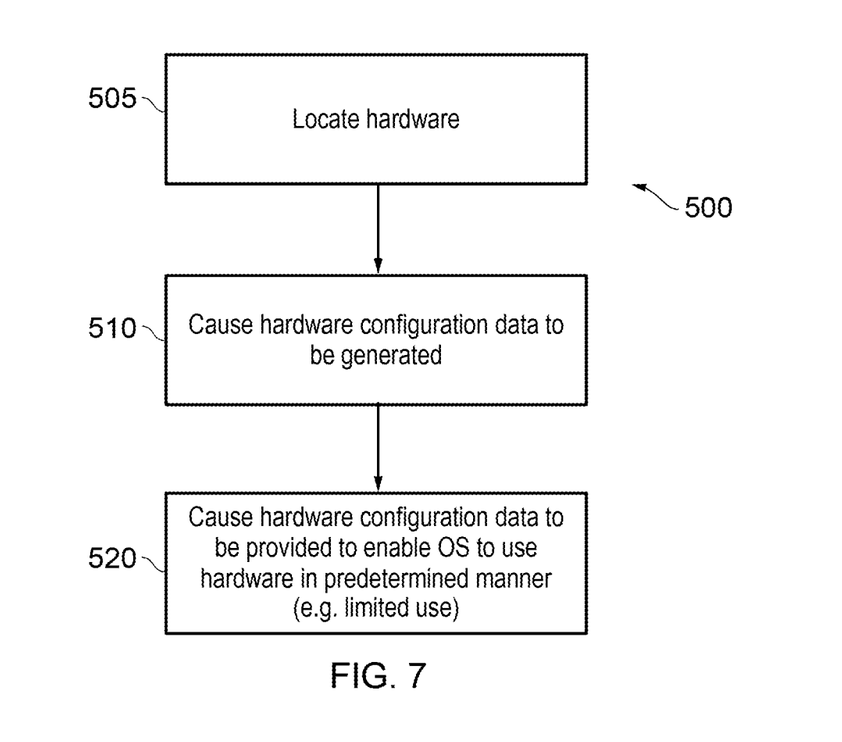
FIG. 7 is of a flowchart illustrating a method of data processing in accordance with one embodiment.

FIG. 7 illustrates a method of data processing in accordance with one embodiment. The method is illustrated as a flow chart 500. In a step 505, hardware that is associated with the processing circuitry is located. This location could occur by reading a file, or it could be dynamically achieved by issuing one or more queries. In a step 510, hardware configuration data is generated. The hardware configuration data relate to the hardware that is available to the processing circuitry and could be generated, for example, via compilation. Finally, in a step 520, the hardware configuration data is provided to an operating system that executes on the processing circuitry. In this way, the operating system is made able to utilise the hardware in a predetermined manner, such as limiting its use or by causing it to communicate with the hardware in a specific way, etc.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
hardware locating circuitry to locate hardware associated with processing circuitry by issuing queries to one or more items of potential hardware to verify the presence of said one or more items of potential hardware;
compilation circuitry to receive hardware information from said hardware locating circuitry, and to compile said hardware information to dynamically generate one or more firmware tables comprising hardware information and parameters relating to said hardware; and
providing circuitry to cause said one or more firmware tables to be provided to an operating system executing on said processing circuitry to enable said operating system to utilise said hardware in a predetermined manner.

2. The data processing apparatus according to claim 1, comprising:
specification gathering circuitry to obtain one or more parameters relating to said hardware and to provide said one or more parameters to said compilation circuitry, wherein
said compilation circuitry compiles said hardware information to generate said one or more firmware tables in dependence on said one or more parameters.

3. The data processing apparatus according to claim 2, wherein
said one or more parameters relating to said hardware are provided by management circuitry.

4. The data processing apparatus according to claim 1, comprising:
cache circuitry to cache said hardware information.

5. The data processing apparatus according to claim 1, wherein
said hardware locating circuitry is to locate hardware associated with said processing circuitry by accessing a list of potential hardware and issuing a query for one or more items in said list.

6. The data processing apparatus according to claim 5, wherein
said list of potential hardware is provided by said processing circuitry.

7. The data processing apparatus according to claim 5, wherein
said list of potential hardware is statically stored on either said data processing apparatus or said processing circuitry.

8. The data processing apparatus according to claim 1, wherein
said hardware locating circuitry is to locate said hardware and said providing circuitry is to cause said one or more firmware tables to be provided during startup of said operating system.

9. The data processing apparatus of claim 1, wherein
said one or more firmware tables comprises at least one standard-specified firmware table.

10. The data processing apparatus of claim 1, wherein
said one or more firmware tables comprises one or more ACPI tables.

11. The data processing apparatus of claim 1, wherein
said one or more firmware tables comprises one or more SMBIOS tables.

12. The data processing apparatus of claim 1, wherein
said data processing apparatus comprises said processing circuitry.

13. The data processing apparatus of claim 1, wherein
said predetermined manner inhibits or restricts the use of the hardware associated with the processing circuitry.

14. A data processing method, comprising:
locating hardware associated with processing circuitry by issuing queries to one or more items of potential hardware to verify the presence of said one or more items of potential hardware;

compiling said hardware information to dynamically generate one or more firmware tables comprising hardware information and parameters relating to said hardware; and causing said one or more firmware tables to be provided to an operating system executing on said processing circuitry to enable said operating system to utilise said hardware in a predetermined manner.

15. A data processing apparatus comprising:

means for locating hardware associated with processing circuitry by issuing queries to one or more items of potential hardware to verify the presence of said one or more items of potential hardware;

means for compiling said hardware information to dynamically generate one or more firmware tables comprising hardware information and parameters relating to said hardware; and means for causing said one or more firmware tables to be provided to an operating system executing on said processing circuitry to enable said operating system to utilise said hardware in a predetermined manner.

\* \* \* \* \*